Oct. 31, 1950     M. H. INGELS     2,527,553
VARIABLE POROSITY MATERIAL FOR PARACHUTES

Filed Dec. 9, 1946     2 Sheets-Sheet 1

Inventor
MARION H. INGELS

Inventor
MARION H. INGELS

Patented Oct. 31, 1950

2,527,553

UNITED STATES PATENT OFFICE 2,527,553

VARIABLE POROSITY MATERIAL FOR PARACHUTES

Marion Hunt Ingels, United States Navy

Application December 9, 1946, Serial No. 715,125

4 Claims. (Cl. 244—145)

(Granted under the act of March 3, 1883, as amended April 30, 1928; 370 O. G. 757)

This invention relates generally to parachutes and specifically to an improvement in parachutes in which the initial shock and the initial high air-pressure concentrations encountered on the opening of the parachute are lessened or substantially eliminated.

To persons versed in the art it is known that the opening of the conventional type of parachute is accompanied by a shock representing the decelerating force applied by the parachute at the moment of opening to the load carried by it.

This force results from the air pressure on the parachute which reaches a maximum soon after the opening of the parachute and drops to a minimum as the load is decelerated. It is further known that this force or air pressure concentration is greatest at the apex or in the center of the parachute. Conventional type parachutes have vents at this point for purposes of releasing air pressures and for purposes of stability. Any increase in the size of the vent allows more air to escape but also permits a greater rate of descent. Similarly, a greater load results in greater air pressures in the region of the vent and also results in a greater rate of descent, and a greater shock upon opening.

With these defects in view, it is one object of this invention to provide a parachute which will operate to open when ejected from aircraft traveling at high rates of speeds without subjecting the canopy to excessive impact forces on opening.

A further object of this invention is to provide a parachute which will reduce the initial shock applied to the load on opening of the parachute.

A still further object of this invention is to eliminate the concentration of high air pressure on the apex of the canopy as normally encountered on the opening of the parachute, and to permit a conventional rate of descent after the initial shock of opening has subsided.

It has been found that the use of a material of variable porosity for all or part of the parachute canopy satisfactorily eliminates all or substantially all of the shock of opening and it is therefore a further object of this invention to devise a material of variable porosity for use in the construction of para-canopies to eliminate or reduce the shock of opening.

Other objects and advantages of the invention will become apparent from the following detailed description taken in connection with the accompanying drawings in which, Figure 1 is a parachute canopy embodying one form of this invention;

Figure 1:
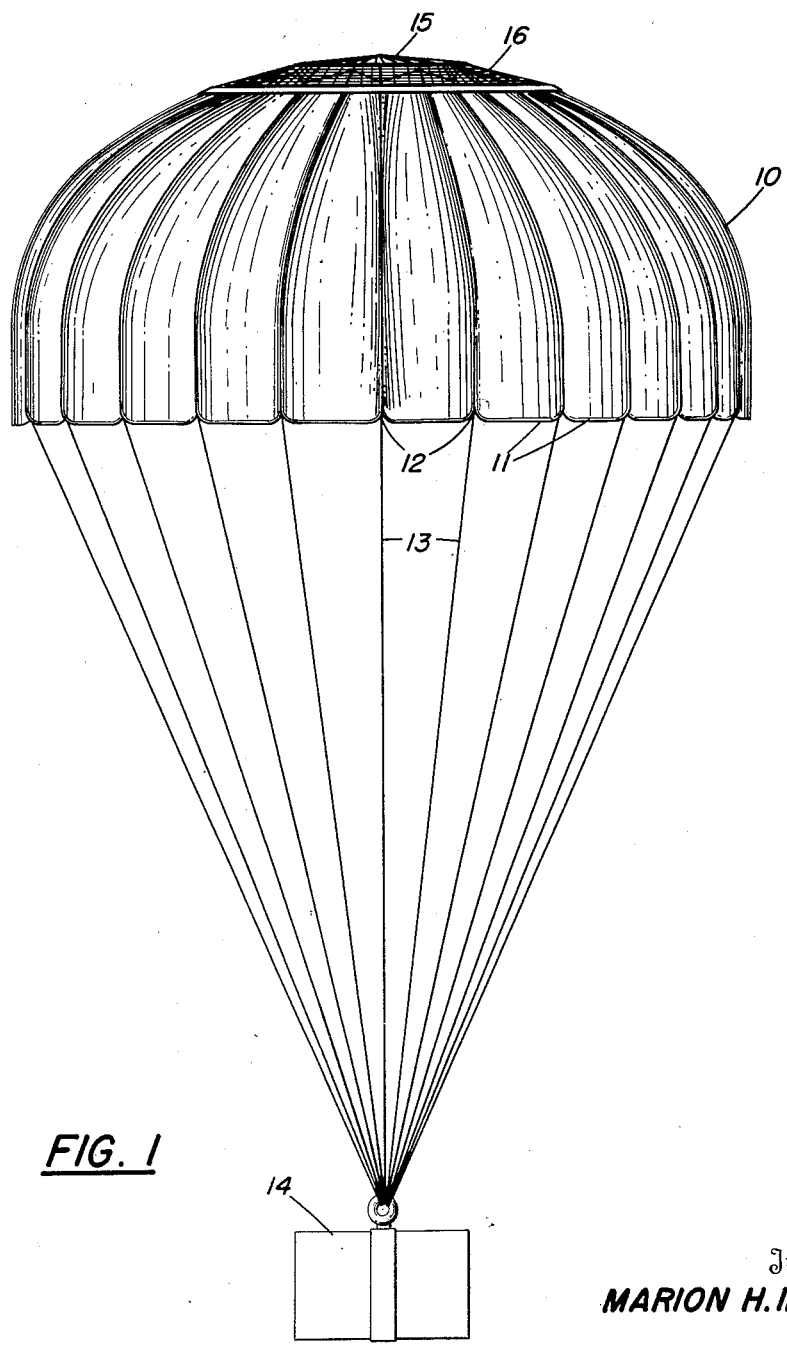

Referring in more detail to Figure 1, the canopy 10 has sections or gores 11, and reinforcing tapes fashioned into seams 12 fastened into shroud lines 13 which support the load as represented at 14. The variable porosity material surrounds the vent chimney 15 and is represented at 16.

Figure 2:
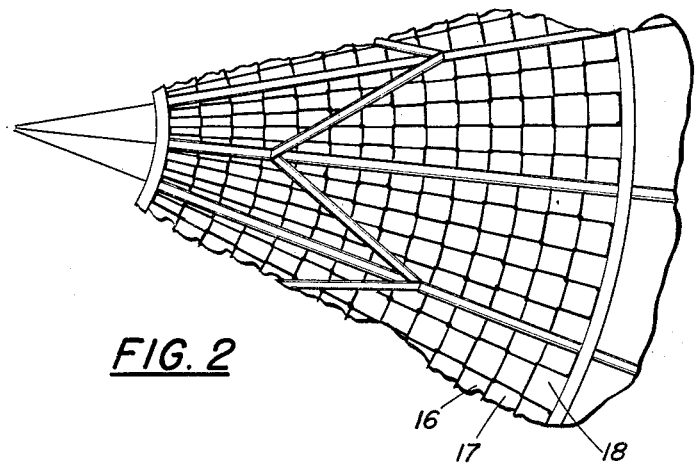
Figure 2 is a view of the section of the parachute surrounding the vent chimney.

Referring to Figure 2, the variable porosity material 16 is composed of cloth strips 17 and 18 cut on the bias and interwoven to form a substantially continuous fabric.

Figure 3:
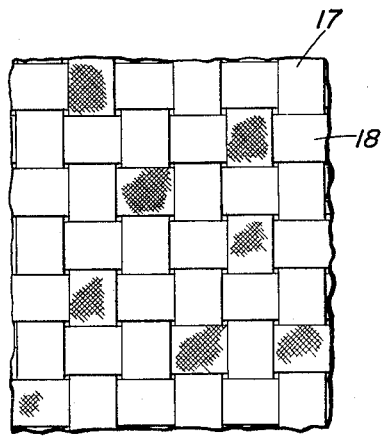
Figure 3 is a fragmental view of the material strips of this invention under normal air pressure.

In Figure 3 is shown the strips 17 and 18 under low air pressure and presenting a substantially impervious barrier to the passage of the air.

Figure 4:
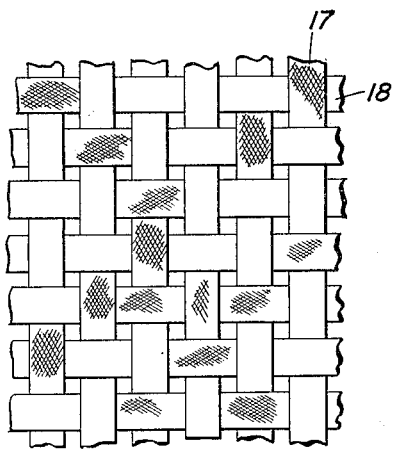
Figure 4 is a fragmental view of the same material strips of this invention under greater air pressure.

In Figure 4, the strips 17 and 18 are shown under the impact load of opening of the canopy and in the stretched position of bias cut material permitting the passing of air between the strips to lessen the shock as aforesaid.

It will be seen that the use of this variable porosity material is not limited to the type of parachute nor to the particular position on the canopy as illustrated nor to the design or width of the strips used. It has been found that nylon cloth as used in conventional parachutes is satisfactory material to cut into strips on the bias, but it will be seen that other material either woven, formed or treated to stretch and to become narrower in width as bias-cut material is commonly known to do will be satisfactory as well. And obviously, the variable porosity material may be used to comprise all of the canopy, although it is satisfactorily effective when used in the section of the canopy immediately surrounding the vent chimney.

The particular parachute canopy construction shown in the accompanying drawings is the preferred form in which I have contemplated embodying this invention but it is nevertheless to be taken as primarily illustrative and it is intended that the disclosure shall cover by suitable expression in the appended claims whatever features of patentable novelty exist in the invention described.

This invention herein described may be manufactured and used by or for the Government of the United States of America for governmental purposes without the payment of any royalties thereon or therefor.

I claim:

1. A parachute for use with large loads or at high air speeds comprising a canopy having a means for alleviating shock and high air pressure concentrations on the canopy, said means comprising a variable porosity sheet material fabricated of interwoven bands of bias cut cloth whereby upon application of air pressure, the bands will be subjected to longitudinal tension and will contract in width to provide pores increasing in size with increasing applied air pressure and decreasing in size with decreasing air pressure.

2. A parachute for use with heavy loads or at high air speeds comprising an umbrella-shaped canopy having means for substantially eliminating the shock or opening with a heavy load or after ejection from an aircraft moving at a high rate of speed, said means comprising an uppermost portion only of the canopy and fabricated of interlaced bands of bias-cut cloth, said bands woven together to form a substantially continuous fabric whereby upon application of the pressure of the air trapped within the canopy upon opening, the resultant elastic bands will be subjected to longitudinal tension and will contract in width to provide air-venting spaces between the bands, the said spaces increasing in size with increasing air pressure and decreasing in size with decreasing air pressure.

3. In the parachute of claim 2 wherein the bands are of uniform cross-sectional elasticity.

4. A parachute for use with heavy loads or at high air speeds comprising an umbrella-shaped canopy having means for substantially eliminating the shock of opening with a heavy load or after ejection from an aircraft moving at a high rate of speed, said means comprising a canopy fabricated of interlaced cloth bands, each of said bands having all of its threads angularly disposed to the longitudinal axis of the band and having no threads longitudinally disposed therein, said bands woven together to form a substantially continuous fabric whereby upon application of the pressure of the air trapped within the canopy upon opening, the resultant bands will be subjected to longitudinal tension and will contract in width to provide air-venting spaces between the bands, the said spaces increasing in size with increasing air pressure and decreasing in size with decreasing air pressure.

MARION HUNT INGELS.

REFERENCES CITED

The following references are of record in the file of this patent:

UNITED STATES PATENTS

| Number | Name | Date |
|---|---|---|
| 1,743,951 | Avorio | Jan. 14, 1930 |
| 1,784,774 | Avorio | Dec. 9, 1930 |
| 2,260,052 | Passavant | Oct. 21, 1941 |
| 2,404,659 | Rohulick | July 23, 1946 |

FOREIGN PATENTS

| Number | Country | Date |
|---|---|---|
| 267,249 | Italy | Aug. 30, 1929 |
| 791,827 | France | Oct. 7, 1935 |